United States Patent
Kwoka

[11] Patent Number: 5,890,573
[45] Date of Patent: Apr. 6, 1999

[54] COUPLING UNIT HAVING AT LEAST ONE VISCOUS COUPLING AND ONE FRICTION COUPLING

[75] Inventor: Georg Kwoka, Much, Germany

[73] Assignee: GKN Viscodrive GmbH, Germany

[21] Appl. No.: 769,658

[22] Filed: Dec. 19, 1996

[30] Foreign Application Priority Data

Dec. 21, 1995 [DE] Germany .................. 195 48 090.2

[51] Int. Cl.⁶ .................................................... F16D 13/04
[52] U.S. Cl. ........................ 192/35; 192/58.41; 192/93 A
[58] Field of Search ................. 192/48.9, 54.32, 192/54.52, 57, 58.41, 35, 85 A, 93 A; 74/650

[56] References Cited

U.S. PATENT DOCUMENTS

| | | | |
|---|---|---|---|
| 2,702,107 | 2/1955 | Hahn | ............................. 192/54.32 X |
| 4,012,968 | 3/1977 | Kelbel . | |
| 4,224,838 | 9/1980 | Roushdy et al. . | |
| 4,829,849 | 5/1989 | Masuda et al. | ............................ 74/650 |
| 4,836,051 | 6/1989 | Guimbretiere . | |
| 4,905,808 | 3/1990 | Tomita et al. . | |
| 4,966,268 | 10/1990 | Asano et al. . | |
| 4,982,808 | 1/1991 | Taureg et al. . | |
| 5,007,515 | 4/1991 | Shimizu . | |
| 5,007,885 | 4/1991 | Yamamoto et al. . | |

(List continued on next page.)

FOREIGN PATENT DOCUMENTS

| | | |
|---|---|---|
| 0 247 008 | 5/1987 | European Pat. Off. . |
| 0 314 420 | 5/1989 | European Pat. Off. . |
| 0 347 165 | 6/1989 | European Pat. Off. . |
| 0 391 722 | 4/1991 | European Pat. Off. . |
| 0 480 175 | 9/1991 | European Pat. Off. . |
| 0 549 828 | 12/1991 | European Pat. Off. . |
| 06 39 730 | 8/1994 | European Pat. Off. . |
| 9 38 813 | 7/1949 | Germany . |
| 2 209 879 | 9/1972 | Germany . |
| 34 26 460 | 7/1984 | Germany . |
| 36 09 419 | 10/1986 | Germany . |
| 41 03 054 | 8/1991 | Germany . |
| 40 32 245 | 3/1992 | Germany . |
| 64-87928 | 4/1989 | Japan . |
| 1-126440 | 5/1989 | Japan . |
| 1-220728 | 6/1989 | Japan . |
| 2-51626 | 2/1990 | Japan . |
| 2-120529 | 5/1990 | Japan . |
| 2-120530 | 5/1990 | Japan . |
| 3-37455 | 2/1991 | Japan . |
| 3-69829 | 3/1991 | Japan . |
| 1 333 878 | 10/1973 | United Kingdom . |
| 2 202 602 | 9/1988 | United Kingdom . |
| 2 222 232 | 2/1990 | United Kingdom . |
| 86 02133 | 10/1986 | WIPO . |

*Primary Examiner*—Charles A. Marmor
*Assistant Examiner*—Saúl J. Rodríguez
*Attorney, Agent, or Firm*—Dinnin & Dunn, P.C.

[57] ABSTRACT

The invention relates to a coupling unit having a viscous coupling A and a friction coupling B. The coupling housing 29 of the friction coupling B is connected to the input and the hub 12 of the viscous coupling A to the output. Between the end face of the housing 17 of the viscous coupling A and the end face of the pressure plate 28 of the friction coupling B there are provided setting means 27 in the form of ramps. Up to a predetermined torque value, the torque is transmitted from the coupling housing 29 to the hub 12, i.e. it is transmitted only by the viscous coupling A to the hub 12 and the plug-in shaft connected thereto, and after the predetermined torque has been exceeded, torque is additionally transmitted by the friction coupling B via the coupling hub 48 to the plug-in shaft also connected to the latter. By associating the setting means with the end faces at the housing 17 and pressure plate 28 it is ensured that when using such coupling units in motor vehicles for at least partially blocking the functions of an axle differential, it is possible to obtain characteristic curves for blocking purposes of the most varied type because the setting means are provided with long rotational paths for being converted into axial setting movements.

5 Claims, 5 Drawing Sheets

U.S. PATENT DOCUMENTS

| | | |
|---|---|---|
| 5,012,908 | 5/1991 | Kobayashi et al. . |
| 5,031,743 | 7/1991 | Morishita et al. . |
| 5,036,963 | 8/1991 | Murata . |
| 5,056,640 | 10/1991 | Yamamoto . |
| 5,058,027 | 10/1991 | Webb . |
| 5,063,738 | 11/1991 | Asano et al. . |
| 5,070,975 | 12/1991 | Tanaka et al. . |
| 5,080,187 | 1/1992 | Asano et al. . |
| 5,127,503 | 7/1992 | Gratzer . |
| 5,129,870 | 7/1992 | Pierce . |
| 5,178,249 | 1/1993 | Haga et al. . |
| 5,197,583 | 3/1993 | Sakai et al. . |
| 5,259,488 | 11/1993 | Oberdorster et al. . |
| 5,261,862 | 11/1993 | Pierce . |
| 5,267,916 | 12/1993 | Beim et al. . |
| 5,690,201 | 11/1997 | Gassmann ............................ 192/57 X |
| 5,706,923 | 1/1998 | Gassmann ................................ 192/57 |

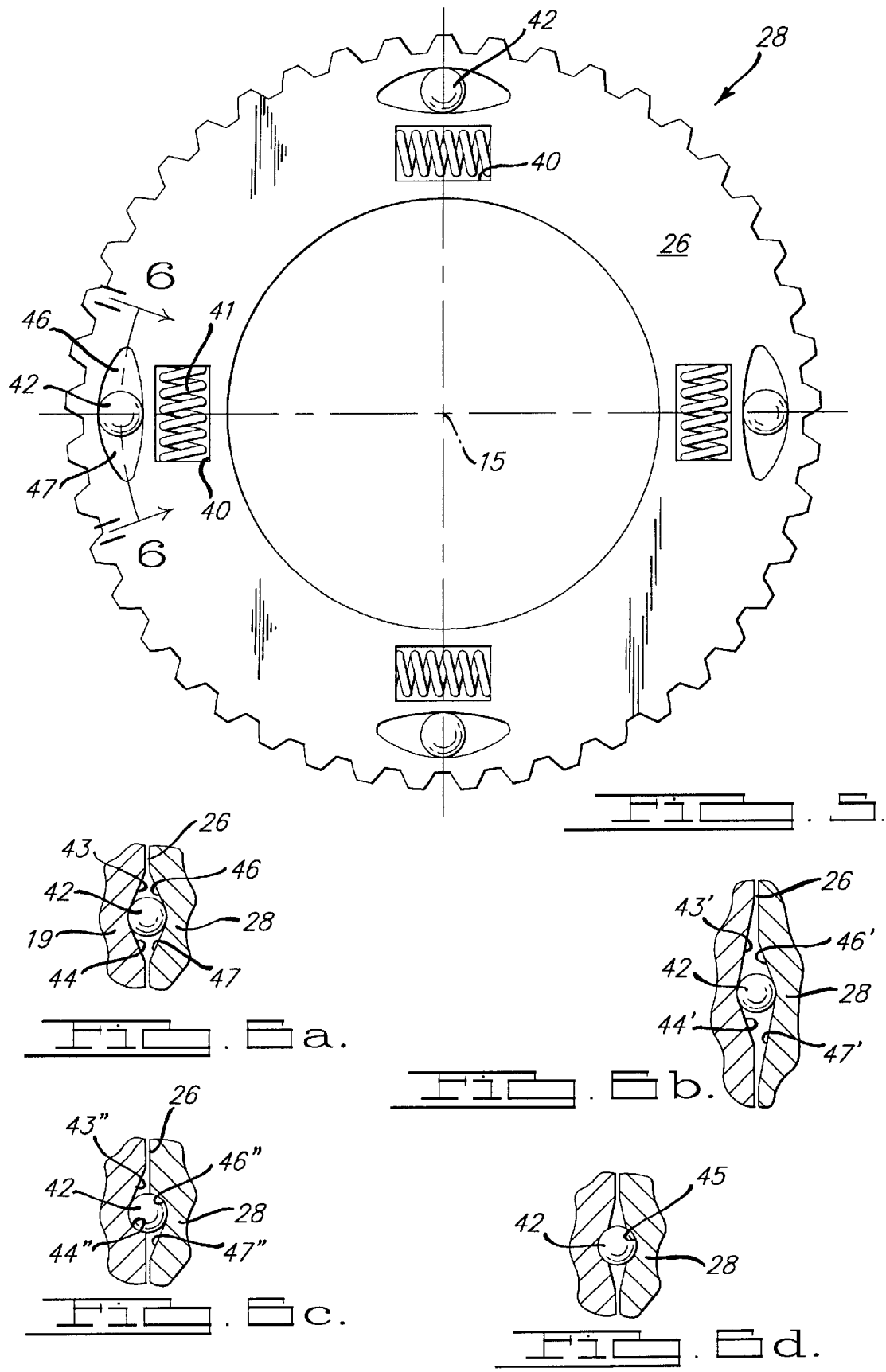

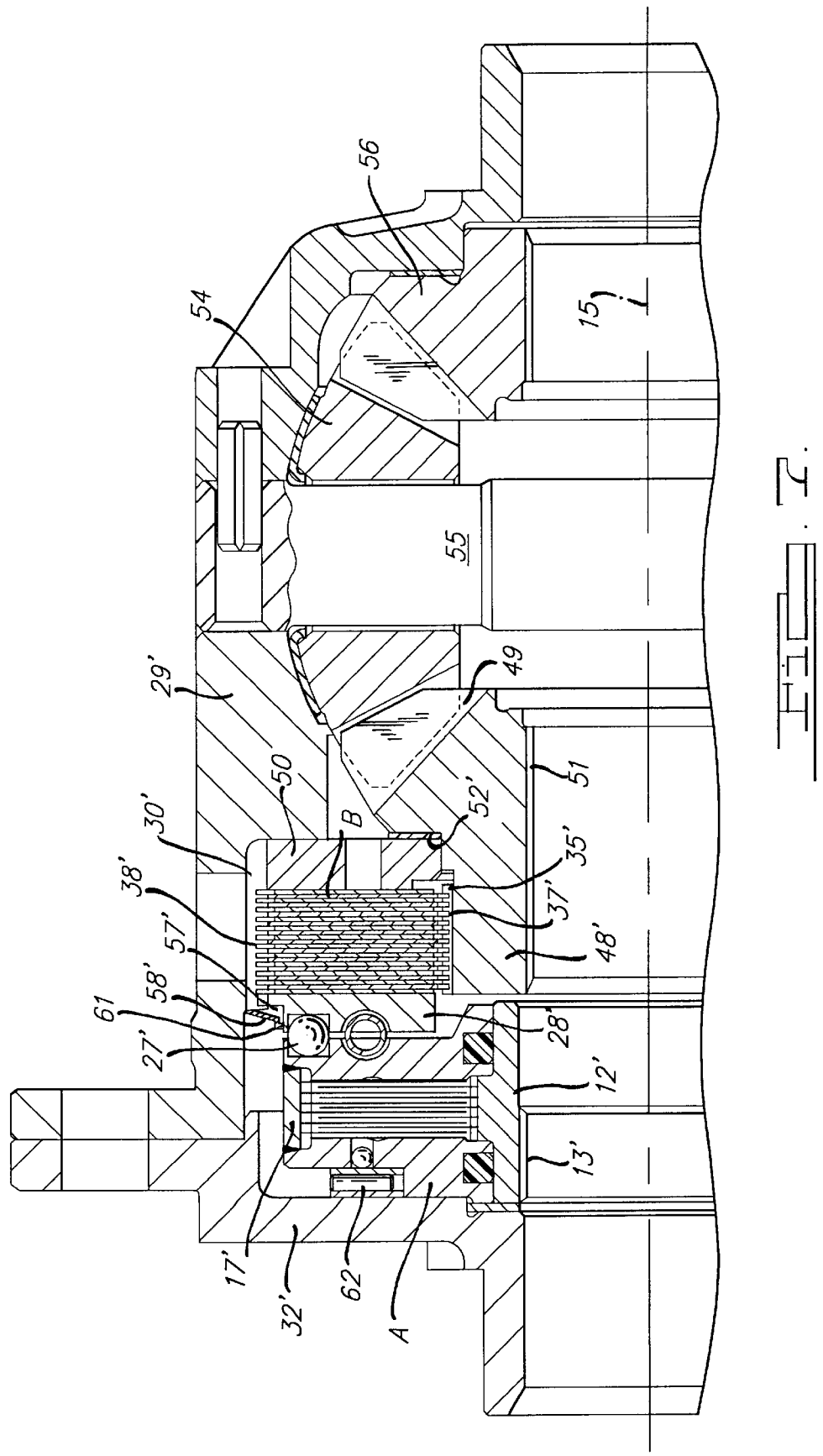

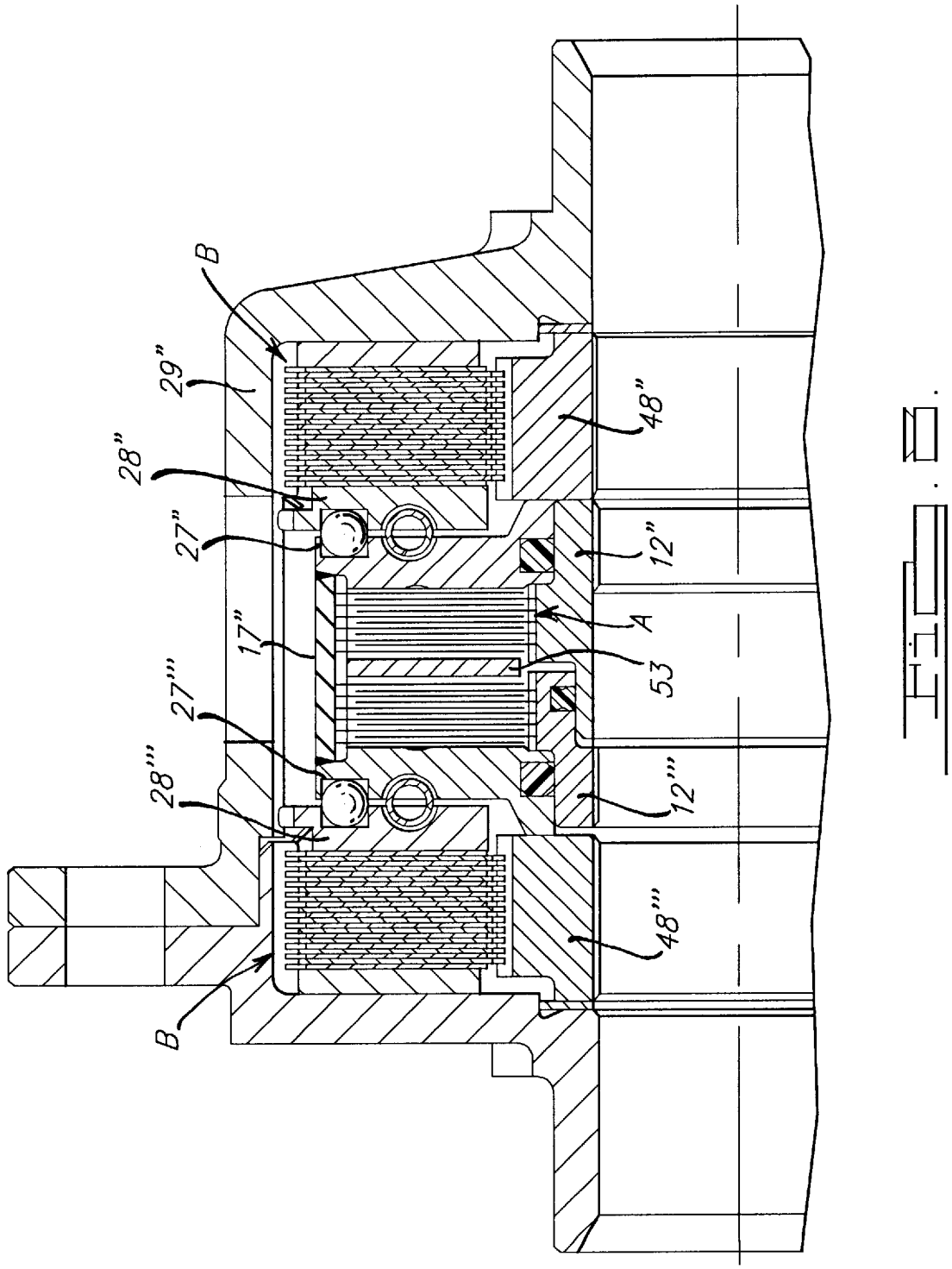

COUPLING UNIT HAVING AT LEAST ONE VISCOUS COUPLING AND ONE FRICTION COUPLING

BACKGROUND OF THE INVENTION

The invention relates to a coupling unit having one viscous coupling and at least one friction coupling as well as setting means with the viscous coupling comprising first and second plates which at least partially overlap in the radial direction, of which the first plates are fixedly associated with a first plate carrier and of which the second plates are fixedly associated with a second plate carrier, in both cases in the direction of rotation around the longitudinal axis while being arranged in an enclosed space between said carriers, which space is otherwise at least partially filled with a high-viscosity viscous medium, especially silicone oil, with the first or second plates being arranged along the longitudinal axis at a fixed distance from one another, with each friction coupling comprising a coupling housing, a pressure plate, a coupling hub, first and second radially at least partially overlapping friction plates and a load relieving spring loading the pressure plate away from the friction plates, wherein the first friction plates are fixedly connected to the coupling hub, and wherein the second friction plates are fixedly connected to the coupling housing, in both cases in the direction of rotation around the longitudinal axis, with the setting means becoming effective when a predetermined speed differential is reached between the first and second plates of the viscous coupling. Such a coupling unit with one viscous coupling and one friction coupling is described in WO 86/02133. The coupling unit comprises one housing jointly occupied by the viscous coupling and the friction coupling in that this housing is provided with teeth for directly receiving the outer plates of the viscous coupling. The viscous coupling is separated by a cover from the friction assembly of the friction coupling also received in the housing. Furthermore, there is provided a common central shaft rotatably receiving the hub of the viscous coupling. Furthermore, the hub, by means of one end face, is supported in one direction of the longitudinal axis on a stop fixedly associated with the shaft. At the end face facing away therefrom, there are arranged setting means in the form of projection which are distributed around the longitudinal axis and which engage opposed axial recesses in a pressure plate which, in the direction of rotation around the longitudinal axis, is fixedly associated with the shaft and adjustable along same, so that the relative rotation between the hub of the viscous coupling and the shaft and pressure plate respectively leads to an adjustment of the pressure plate along the longitudinal axis. The friction coupling comprises two sets of friction plates one set of which is firmly received in teeth of the joint housing, with the other set being non-rotatably connected to a coupling hub which, in turn, in the direction of rotation, is fixedly arranged on the shaft and which, in the direction of the longitudinal axis, is supported on a stop of same. A load relieving spring is arranged between the pressure plate and the coupling hub of the friction coupling. A disadvantage of this embodiment is that the housing comprises the teeth for both the friction plates and for the outer plates. If the viscous coupling is found to be defective, it has to be disassembled in its entirety. This is particularly disadvantageous because the viscous coupling contains the viscous medium (silicone oil). There exists a further disadvantage in that the setting means are arranged on the smallest diameter, i.e. that of the hub. This means that a fine graduation and precision connection are not possible because even the slightest rotational adjustment results in large axial movements. This also means that there is available only a small distance for overcoming the counter-force of the load relieving spring and that the viscous coupling has to generate correspondingly high forces. Furthermore, with such setting forces, the setting means are subjected to high loads.

DE 34 26 460 C1 describes a coupling unit wherein one end wall of the viscous coupling constitutes a movable piston which loads the pressure plate of the friction coupling, i.e. the transmission of torque takes place entirely in accordance with the characteristics of the friction coupling. The viscous coupling only serves to load the friction coupling. As the viscous coupling only serves to actuate the friction coupling, it comprises a negligibly small transferable nominal torque relative to the friction coupling. Connection takes place entirely on the basis of the temperature behavior of the viscous coupling.

SUMMARY OF THE INVENTION

It is the object of the invention to provide a coupling unit which comprises at least one friction coupling and one viscous coupling, wherein the characteristic torque transmission curve can be adapted, within wide limits, to the respective application and wherein, in addition, at least for one predetermined value, the transmission of torque is effected entirely, or to a considerable extent, by the viscous coupling. Furthermore, the intention is to simplify the maintenance procedure and to improve the specific load on, and the reaction behavior of, the setting means.

In accordance with the invention, the objective is achieved in that the viscous coupling constitutes a separate closed unit which comprises at least one hub as the first plate carrier and a housing as the second plate carrier supporting said hub, which plate carriers enclose the space receiving the first and second plates and the viscous medium, that the coupling housing of the friction coupling(s) receives the viscous coupling, so that both are centered on the longitudinal axis, that at least one of the two end faces of the housing of the viscous coupling is positioned opposite the end face of the pressure plate of a friction coupling, which end faces are associated with the setting means which load the pressure plate as a function of the rotational position of the housing of the viscous coupling relative to the pressure plate and are effective in at least one direction of rotation, that the load relieving spring is supported on the coupling housing on the one hand and on the pressure plate on the other hand and loads the pressure plate towards the opposed end face of the housing of the viscous coupling and that the pressure plate of each friction coupling is fixedly connected to the coupling housing in the direction of rotation around the longitudinal axis while being adjustably connected to same along the longitudinal axis.

The advantage of this embodiment is that in the case of small speed differentials, torque transmission is effected entirely by the viscous coupling, and a further advantage consists in that the viscous coupling features practically no reaction time, i.e. it becomes effective as soon as a speed differential occurs. The friction coupling is not connected until a rotational adjustment has taken place between the housing of the viscous coupling and the pressure plate. It is only then that the friction coupling is loaded enabling same to participate progressively in the transmission of torque. Finally, it is advantageous to be able to achieve a condition of asymmetry, i.e. to provide different characteristic torque transmission curves in the two possible directions of rotation. There exists a further advantage in that the viscous coupling has a damping effect which can be utilized for the coupling unit. The overall characteristic curves of the coupling unit can be influenced by different factors, inter alia by the viscosity of the viscous medium used and the design of the setting means, but also by the level to which the viscous coupling is filled, for example whether it is designed in such a way that it always operates in the viscous mode or whether there also exists the possibility of a so-called hump mode, i.e. an operating condition in which the plates of the viscous coupling establish friction contact with one another, with the pressure in the coupling having increased to such an extent that there exists a direct through-drive. It is equally advantageous that the setting means can be arranged on a large diameter, making it possible to use a relatively large rotational path to achieve the necessary axial adjustment. This leads to low setting forces and a high degree of freedom as regards the type of reaction behavior. By separating the viscous coupling it is possible to reduce the amount of assembly and dismantling work and the maintenance procedures affecting the setting means. The operation of replacing the viscous coupling is also simplified.

According to a further embodiment of the invention, the coupling unit is composed of one viscous coupling and two friction couplings, with the viscous coupling having one housing and two hubs. The first plates are divided into two parts, with some of the first plates being associated with the one hub and others with the second hub whereas all the second plates are associated with the housing.

In this embodiment it is proposed that the housing shared by the two friction couplings is intended to be connected to an input and that one hub of each of the friction couplings and one of the two hubs of the viscous coupling are intended to be jointly connected to one each of the two outputs.

Such an assembly is suitable for example for the drive concept of a motor vehicle wherein, under normal operating conditions, there is provided a front wheel drive for example, with the rear wheel drive being connected only if speed differentials occur at the front and rear wheels, i.e. between the two axles. Under normal operating conditions, that is on a dry surface, there are no speed differentials between the plates of the viscous coupling, because the rear wheels are taken along. Only when the front wheels rotate faster than the rear wheels does a speed differential occur, so that the rear wheel drive is connected, driving the rear wheels. With such a viscous coupling assembly wherein there are provided two hubs and two friction couplings, it is possible to provide only one set of setting means and to support the housing along the longitudinal axis in a floating way, so that the housing loads the pressure plates of both friction couplings, on the one hand directly with the help of the setting means and on the other hand by adjusting the housing of the viscous coupling along the longitudinal axis.

In the preferred embodiment, the setting means are provided in the form of ramp faces supporting one another, with the ramp faces, in at least one direction of rotation, being effective around the longitudinal axis, i.e. starting from a starting position assumed by the housing and the pressure plate in the unactuated condition. However, it is also possible to provide an assembly wherein torque is transmitted in two directions of rotation.

With such a ramp face embodiment, the friction forces can be reduced by arranging rolling contact members between the ramp faces.

Asymmetry regarding the effectiveness in both directions of rotation can be achieved by ensuring that the ramp faces extend differently in the two directions of rotation. It is also conceivable for the friction coupling to be effective in only one direction of rotation and for the viscous coupling to be effective in both directions of rotation. Furthermore, it is possible to provide a position of rest in the starting position, by means of the position of rest it is possible to determine the point in time at which the friction coupling is connected, i.e. the position of rest first has to be overcome.

According to a further embodiment, it is proposed that for the purpose of returning the housing of the viscous coupling relative to the pressure plate of the friction coupling, a return spring is arranged between said two parts so as to act in the circumferential direction.

In case the viscous coupling comprises two hubs, there is provided a separating wall for keeping the first plates at a distance.

If there is provided only one viscous coupling and one friction coupling, the housing of the viscous coupling is immovably supported in one direction of the longitudinal axis against the coupling housing of the friction coupling.

If the coupling unit is used in the axle differential of a motor vehicle for example, it is proposed that the coupling housing of the friction coupling is formed by the differential carrier and that the coupling hub of the friction coupling is formed by an output bevel gear of the axle differential.

Various embodiment of a coupling unit in accordance with the invention and motor vehicle drive concepts for which said coupling units are suitable are diagrammatically illustrated in the drawing and explained in greater detail with reference thereto.

BRIEF DESCRIPTION OF THE DRAWINGS

FIG. 5 is a section V—V according to FIG. 4.

FIGS. 6a–6d show details in an enlarged scale, regarding the various possibilities of designing the setting means, according to a section VI—VI of FIGS. 4 and 5.

FIG. 7 is half a longitudinal section through a coupling unit forming an integrated part of an axle differential.

FIG. 8 shows a coupling unit which comprises one viscous coupling and two friction couplings and which takes on a differential function.

DESCRIPTION OF THE PREFERRED EMBODIMENT(S)

Figure 1:
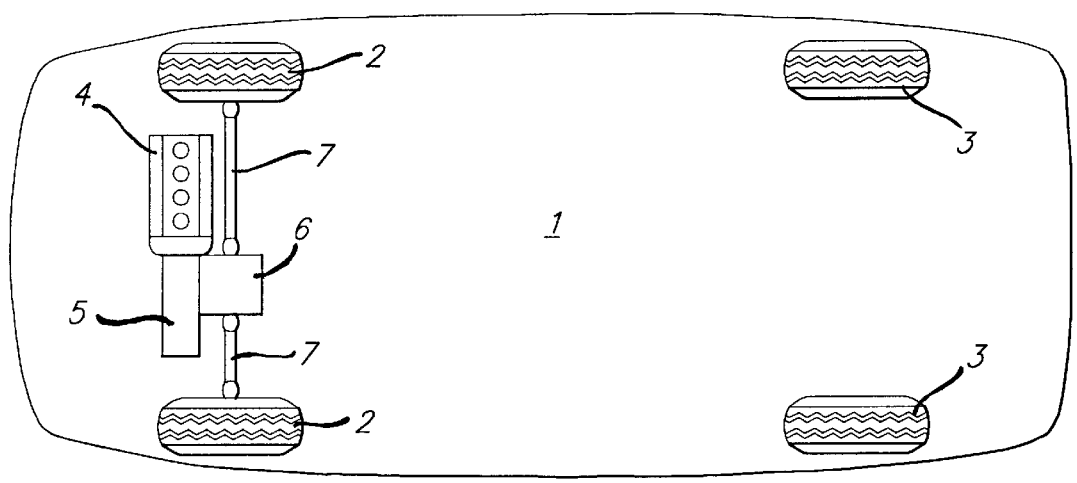
FIG. 1 shows the drive concept of a front wheel drive motor vehicle.

FIG. 1 shows the motor vehicle 1 being a front wheel drive vehicle. This means that only the front wheels 2 are driven and not the rear wheels 3. The rear wheels 3 are only taken along. For driving the front wheels 2 there is provided the engine 4 which, via a manual or automatic gearbox, drives a front axle differential 6 whose two outputs are connected to the two front wheels 2 by side shafts 7. To block the differential function of the axle differential 6 at least partially if slip occurs at one of the two front wheels 2 relative to the ground, it is possible to connect a coupling unit according to FIGS. 4 to 6 to the axle differential 6, but this can also be replaced by an assembly as described in connection with FIG. 7.

Figure 2:
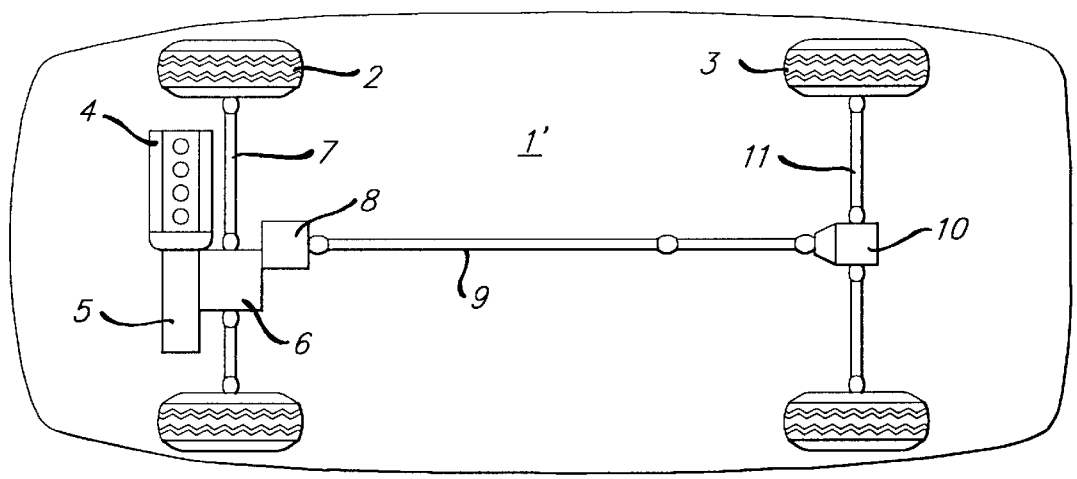
FIG. 2 shows the drive concept of a motor vehicle provided with a permanent front wheel drive and a selectively connectable rear wheel drive.

FIG. 2 shows a motor vehicle 1' which, in principle, is designed as a front wheel drive vehicle, i.e. the front wheels 2 are driven directly by the engine 4 and the gearbox 5 driven thereby, via the axle differential 6 and the side shafts 7. However, the rear wheels 3 are driven in those cases where a speed differential occurs between the front wheels 2 and the rear wheels 3, in which case a driving force is provided by a distributing drive 8 which, via a propeller shaft 9, drives the rear axle differential 10 whose two outputs are connected to the rear wheels 3 by side shafts 11, and a coupling unit according to FIGS. 4 to 6 may be associated with the driveline between the front wheels 2 and the rear wheels 3, for instance with the distributing drive 8. Additionally, or alternatively, it is possible for the rear axle differential 10 to be associated with a coupling unit according to FIGS. 4 to 6 or to provide an axle differential according to FIG. 7 or 8.

Figure 3:
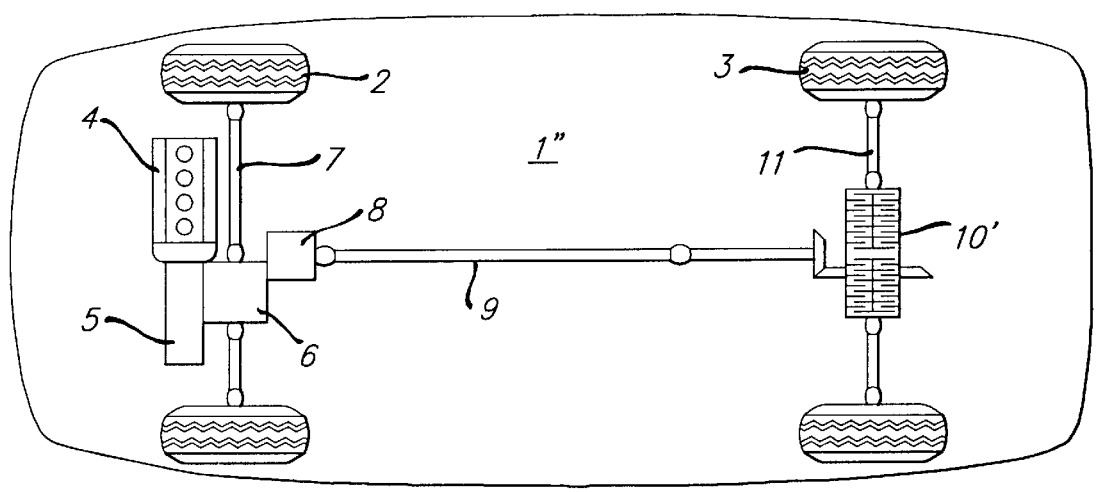
FIG. 3 shows a drive concept of a front wheel drive vehicle with a selectively connectable rear wheel drive, with the rear axle differential being replaced by a coupling unit in accordance with the invention.

The drive concept according to FIG. 3 deviates from that shown in FIG. 2 in that the rear axle differential 10' is replaced by a coupling unit as shown in FIG. 8 for example. Again, the vehicle 1", in principle is designed as a front wheel drive vehicle, i.e. the engine 4, by means of the gearbox 5 and the front axle differential 6, permanently drives the two front wheels 2, whereas the rear wheels 3 are not driven unless there occurs a speed differential between the front wheels 2 and the rear wheels 3, with the driving movement being passed on by the distributing drive 8 and the propeller shaft 9 to the rear axle differential 10' comprising the coupling unit in accordance with the invention and from there, through the side shafts, to the rear wheels 3.

Figure 4:
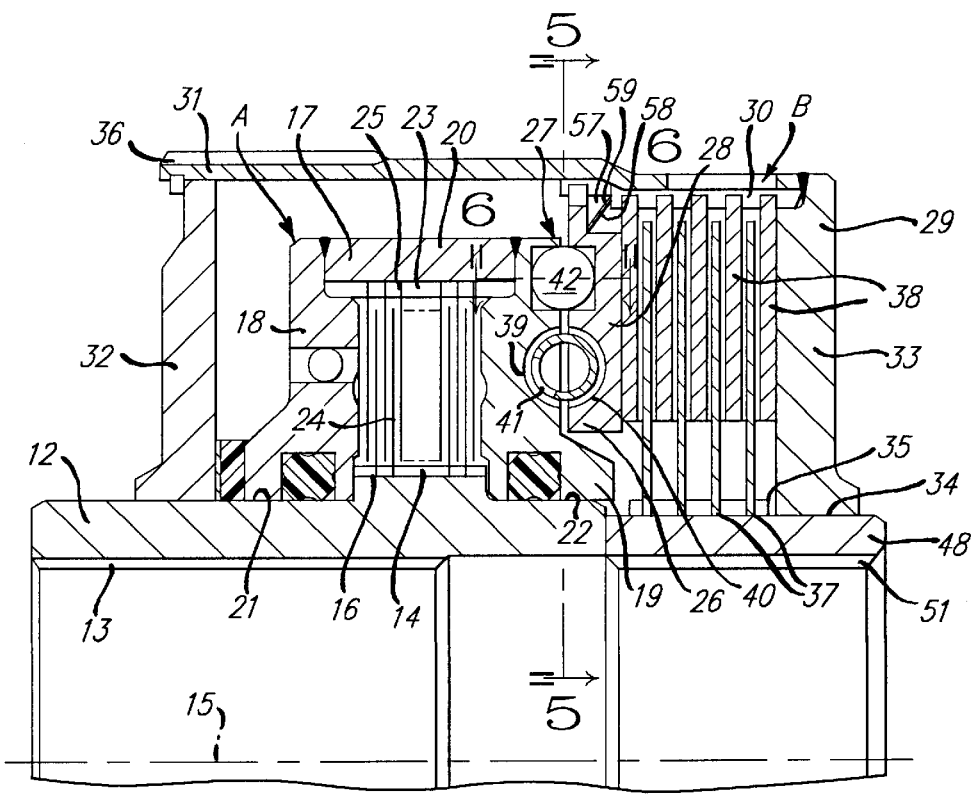
FIG. 4 is half a longitudinal section through a first embodiment of a coupling unit with one viscous coupling and one friction coupling.

FIGS. 4 to 6 show a first embodiment of an invention coupling unit which comprises one viscous coupling A and one friction coupling B. The viscous coupling A is provided with a hub 12 with a bore which comprises inner toothing 13 to be connected to a driving or driven component. If, for example, it is associated with an axle differential of a drive concept according to FIG. 4, it serves to be connected to a side shaft which, in turn, is connected to an output bevel gear of the axle differential. Said hub 12 is centered on the longitudinal axis 15 of the coupling unit. Furthermore, the hub 12 is provided with outer toothing 14 receiving first plates 16 of the viscous coupling A in the direction of rotation around the longitudinal axis 15 in a non-rotating way, but adjustably in the direction of the longitudinal axis 15. On the hub 12, especially on the two bearing faces 21, 22 of same, the housing 17 of the viscous coupling A is received so as to be relatively rotatable around the longitudinal axis 15. The housing 17 consists of a casing 20 and two covers 18, 19 which extend at right angles relative to the casing 20 and comprise bearing bores by means of which they are supported on the two bearing faces 21, 22. The casing 20 of the housing 17, in the inner space I, comprises a set of toothing 23 whose teeth extend parallel to the longitudinal axis 15 and in which there are received second plates 24 in such a way that the second plates 24 rotate together with the housing 17, i.e. they are fixedly connected thereto, and in addition, they are spaced by spacing means 25 in the inner space I defined between the hub 12 and the housing 17. In the above example, one first plate 16 and one second plate 24 radially overlapping said first plate alternate in the direction of the longitudinal axis 15. The remaining inner space I formed between the hub 12 and the housing 17 and between the first and second plates 16, 24 is at least partially filled with a viscous medium, e.g. silicone oil with a high viscosity (1000 to 300,000 cSt). Between the bearing faces 21, 22 of the hub 12 and the covers 18, 19 of the housing there are arranged seals. The viscous coupling A forms a separate unit and is accommodated in the coupling housing 29 of the friction coupling B. By one cover 32 the coupling housing 29 is supported on the bearing face 21 of the hub 12 of the viscous coupling A and by the other cover 33 it is supported on the seat face 34 of the coupling hub of the friction coupling B so as to be rotatable relative to said faces. In addition to the two covers 32, 33, the coupling housing 29 comprises the casing 31 whose inside is provided with the toothing 30 extending parallel to the longitudinal axis 15. Furthermore, the coupling housing 29 comprises a set of outer toothing 36 which serves driving purposes and which can be used, for example, for providing a connection with the differential carrier of an axle differential if the coupling unit is used in an axle differential. In a first portion of the toothing 30 of the coupling housing 29, there are receiving second friction plates 38 which are non-rotatable but adjustable along the longitudinal axis 15. The coupling hub 48 comprises a further set of outer toothing 35 which receives first friction plates 37 so as to be non-rotatable but adjustable in the direction of the longitudinal axis 15; it also comprises a bore with toothing 51. The first and second friction plates 37, 38 are alternately arranged along the longitudinal axis 15 in the coupling housing 29. The coupling housing 29 is supported against the inner face of the cover 33 of the coupling housing 29, and at the other end it is loaded by the pressure plate 28 which, by means of teeth provided on its outer face, is non-rotatably, but axially adjustably received in a portion of the toothing 30 of the housing 29, which portion is stepped relative to the first portion. The step face 57 formed between the two portions of the toothing 30 serves to provide axial support for a load relieving spring 58 which engages an annular recess 59 in a pressure plate 28 and is also axially supported thereagainst the loads same away from the friction plates 37, 38. The pressure plate 28 is adjusted by setting means 27 which are associated with the end face 26 of the cover 19 of the housing 17 of the viscous coupling A on the one hand and with the opposed end face of the pressure plate 28 of the friction coupling B on the other hand. As regards the design of the setting means 27, reference is also made to FIGS. 5 and 6.

FIGS. 5 and 6 show particularly clearly that the end face 26 of the cover 19 and the opposed end face of the pressure plate 28 have been provided with indentations which, in the embodiment according to FIG. 6a, comprise ramp faces 43, 44 in the cover 19 and ramp faces 46, 47 in the pressure plate 28. Between said ramp faces there is provided a rolling contact member in the form of a ball 42. The ramp faces form pairs. This means that the ramp faces 43, 47 cooperate for one direction of rotation while the ramp faces 44, 46 cooperate for the opposed driving direction of rotation, with balls 42 being arranged therebetween. In the embodiment according to FIG. 6a, the ramp faces 43, 47 and 44, 46 are designed to be symmetric for the two directions of rotation. In the embodiment according to FIG. 6b, the ramp faces 43' and 47' are provided with a smaller angle of inclination than the two ramp faces 44' and 46', so that for the two possible directions of torque transmission around the longitudinal axis 15, there are obtained different characteristic torque curves and a different behavior as regards the connection of the friction coupling B by the viscous coupling A. In the embodiment according to FIG. 6c, the ramp faces 44", 46" are designed for one direction of rotation in such a way that only the viscous coupling A is effective, with the friction coupling B not being connected, whereas in the other direction of rotation, the friction coupling B is connected by the viscous coupling A by means of the ramp faces 43", 47". In the embodiment of the ramp faces according to FIG. 6d, there is provided a symmetric design according to FIG. 6a, but in the starting position for the ball 42, there is provided a position of rest in the form of an indentation 45 in the opposed end faces, so that there is no continuous rise regarding the connection of the friction coupling B; instead there occurs a sudden load as soon as torque is achieved, which torque causes the balls 42 to leave the indentations 45. As can be seen in FIG. 5, there are provided four such assemblies as described with reference to FIGS. 6a to 6d; they are arranged on the circumference of the pressure plate 28 in the form of setting means 27 between the housing 17 of the viscous coupling A and the pressure plate 28 of the friction coupling B. In addition, opposed pockets 39, 40 of the housing 17 and the pressure plate 28 each accommodate a return spring 41 which is effective in the circumferential direction around the longitudinal axis 15 and which, together, cause the pressure plate 28 and the housing 17 to assume their starting position in the direction of rotation, which position, as shown in FIGS. 6a to 6d, is occupied by the balls 42 relative to the ramp faces. Relative to the housing 29 of the friction coupling B, the housing 17 of the viscous coupling A, by means of its cover 18, with an intermediate sliding disc 60, is supported on the cover 32 of the coupling housing 29 along the longitudinal axis 15. In the case of a rotational movement which is introduced in the circumferential direction between the coupling housing 29 and the pressure plate 28 via the toothing 36 into the coupling housing 29 and from there via the pressure plate 28 and the setting means 27 into the housing 17 of the viscous coupling and which deviates from that of the hub 12, there occurs a relative rotation between the two plates 16, 24 of the viscous coupling A, which relative rotation causes the viscous medium contained in the inner space I to be sheared, as a result of which a reaction moment is built up between the plates 16, 24. Said reaction moment leads to a driving effect between the coupling housing 29 and the hub 12; initially entirely via the viscous coupling A until a certain predetermined torque is achieved at which torque the return springs 41 are pressed together in the driving direction of rotation and until—as a result of the balls 42 stopping against one of the pairs of ramp faces 43, 47 or 44, 46, depending on the direction of rotation—the setting means become effective, thus causing an expanding effect between the pressure plate 28 and the housing 17 when overcoming the force of the load relieving spring 58, said expanding effect being such that the friction plates 37, 38 are loaded by the pressure plate 28 and that torque is also transmitted by the friction coupling B. The hub 12 of the viscous coupling A and the coupling hub 48, by means of the toothings 13, 51 provided in their respective bores, are connectable to the toothing of a shaft so that they turn jointly with the shaft.

If different characteristics are required for the transmission of torque in both directions of rotation, it is possible for the respective cooperating pairs of ramp faces to extend at different angles of inclination. Such an embodiment is shown in FIG. 6b for example.

FIG. 6c shows an assembly wherein, in one direction of rotation, only the viscous coupling A participates in the transmission of torque, i.e. when the two ramp faces 44", 46" are loaded. In these cases where the two pairs of ramp faces 43" and 47" become effective in the opposed direction of rotation, the friction coupling B is caused to take part in the transmission of torque when a relative adjustment takes place and when the required amount of torque has been transmitted.

FIG. 6d shows an embodiment of the setting means 27 wherein, in the starting position, there is provided a position of rest, i.e. the balls 42 are received in an indentation 45 and the friction coupling B is connected only if the balls 42 are able to leave the indentations 45 after the required amount of torque generated by the viscous coupling A has been transmitted.

FIG. 7 shows an embodiment of an axle differential, with the coupling housing 29' for the friction coupling B simultaneously taking over the function of the differential carrier of the axle differential. In the coupling housing 29', two differential bevel gears 54 are rotatably received on a carrier 55. The carrier 55 is secured in the coupling housing 29' transversely to the longitudinal axis 15. The differential bevel gears 54 engage the output bevel gears 49, 56. The output bevel gear 49 comprises a projection which forms the coupling hub 48' for the friction coupling B and, in consequence, the outer face of same receives the toothing 35' in which the first friction plates 37' are secured in the direction of rotation. Furthermore, the bore of the output bevel gear 49 is provided with toothing 51. The coupling housing 29' comprises toothing 30' in which the second friction plates 38' are received. Towards the output bevel gear 49, the assembly of friction plates 37', 38' by means of an intermediate supporting disc 50, is supported on a supporting face 52 of the output bevel gear with an adjoining sliding disc. The output bevel gear 49 is supported in a bore of the supporting disc 50. By means of the load relieving spring 58 resting against a step face 57' at the end of the toothing 30' and against a securing ring 61 at the pressure plate 28', the pressure plate 28' is loaded towards the viscous coupling. The pressure plate 28' is also received in the toothing 30' in such way that it is non-rotatable, but adjustable along the longitudinal axis 15. Again, the viscous coupling A constitutes a separate unit and is received in the coupling housing 29'. The housing 17' of the viscous coupling A is associated with setting means 27' in an embodiment as explained in connection with FIGS. 4 to 6. The housing 17' of the viscous coupling A is supported against the cover 32' of the coupling housing 29' by means of an axial rolling contact bearing 62. The hub 12' comprises a bore with toothing 13' into which there is inserted a plug-in shaft which, for example, is associated with a side shaft as described in connection with FIGS. 1 to 3 and which extends into the toothing 51 of the output bevel gear 49 so that the hub 12' and the output bevel gear 49 are firmly connected to one another, that is they cannot carry out a relative rotational movement relative to one another. When a relative rotation occurs between the coupling housing 29' and the hub 12' and the output bevel gear 49 respectively, a torque is built up in the viscous coupling A and transmitted to the hub 12'. When a predetermined torque is exceeded, the setting means 27', as already described in connection with FIGS. 4 to 6, also connect the friction coupling B. In addition, as the torque rises, the reaction forces of the teeth of the two engaging bevel gears, i.e. of the output bevel gear 49 and the differential bevel gear 54, act on the supporting disc 50 and from there on the friction assembly of the friction coupling B, which reaction forces increase the pressure between the two sets of friction plates 37', 38'. In consequence, as a result of the relative rotation and the load applied by the setting means 27' and due to reaction forces generated by the teeth of the bevel gears 49, 54, the friction coupling B is made to participate in the transmission of torque.

FIG. 8 shows a coupling unit which comprises one viscous coupling A and two friction couplings B and which takes over the function of a rear axle differential for example. If there are only small speed differentials between the two wheels of the rear axle, these speed differentials are offset by the viscous coupling A as long as the friction couplings B are not connected. This happens when the vehicle negotiates a curve for example. The viscous coupling A comprises two hubs 12", 12'" which are supported in a joint housing 17" and which, while separated by a separating wall 53, are associated with first and second plates. The viscous coupling A is received as a separate unit between two friction couplings B having a joint coupling housing 29" and serves to transmit torque for the two rear wheels of a motor vehicle and for loading the friction couplings B which are connected by the setting means 27" and 27'" from a certain torque onwards and which have a supporting function. Between the two pressure plates 28 there are arranged setting means 27", 27'" which serve to load the friction couplings B when a relative rotation occurs between the housing 171 and the two pressure plates 28", 28'". To ensure that the pressure plates 28", 28'" of the friction couplings B are subjected to a uniform load, the housing 17" of the viscous coupling A is arranged so as to be adjustable in the direction of the longitudinal axis 15. With such an arrangement it is also possible to eliminate the setting means 27'" and to permit a direct contact between the cover of the housing 17" and the pressure plate 28'" of the friction coupling B shown on the left. The two friction couplings B are each associated with a hub 48" and 48'" respectively. The hub 12'" of the viscous coupling A and the hub 48'" of the friction coupling B on the left are non-rotatably connected to one another by means not illustrated, for example in the form of a plug-in shaft which is associated with one of the side shafts used for driving the lefthand rear wheel of a motor vehicle for example, whereas the hub 12" and the hub 48" are non-rotatably connected to one another by the plug-in shaft which is associated with the side shaft driving the righthand rear wheel.

What is claimed is:

1. A coupling unit having one viscous coupling and two friction couplings as well as setting means, with the viscous coupling comprising:

first and second plates which at least partially overlap in a radial direction, of which the first plates are fixedly associated with a first plate carrier and of which the second plates are fixedly associated with a second plate carrier, in both cases in a direction of rotation around a longitudinal axis while being arranged in an enclosed space between said carriers, which space is otherwise at least partially filled with a high-viscosity viscous medium, with the first or second plates being arranged along the longitudinal axis at a fixed distance from one another;

the first carrier comprises two hubs and the second carrier one housing and that a portion of said first plates, in a direction of rotation, are fixedly connected to one hub of said first carrier whereas, the remaining first plates are fixedly connected to the further hub and that the second plates are fixedly connected to the housing in a direction of rotation;

with each friction coupling comprising a coupling housing, a pressure plate, a coupling hub, first and second radially at least partially overlapping friction plates and a load relieving spring loading the pressure plate away from the friction plates, wherein the first friction plates are fixedly connected to the coupling hub, and wherein the second friction plates are fixedly connected to the coupling housing, in both cases in a direction of rotation around the longitudinal axis, with the setting means becoming effective when a predetermined speed differential is reached between the first and second plates of the viscous coupling;

said viscous coupling constitutes a separate, closed unit said coupling housing of the friction coupling receives the viscous coupling, so that both are centered on the longitudinal axis, that at least one of two end faces of the housing of the viscous coupling is positioned opposite an end face of the pressure plate of a friction coupling, which end faces are associated with the setting means, which load the pressure plate as a function of a rotational position of the housing of the viscous coupling relative to the pressure plate and are effective in at least one direction of rotation;

said load relieving spring is supported on the coupling housing on the one hand and on the pressure plate on the other hand and loads the pressure plate towards the opposed end face of the housing of the viscous coupling and that the pressure plate of each friction coupling is fixedly connected to the coupling housing in the direction of rotation around the longitudinal axis while being adjustably connected to same along the longitudinal axis.

2. A coupling unit according to claim 1, wherein the two friction couplings comprise a common coupling housing which is intended to be connected to an input and that one coupling hub of each of the friction couplings and one of the two hubs of the viscous coupling are intended to be jointly connected one to each of two outputs.

3. A coupling unit according to claim 2, wherein one of the pressure plates is associated with setting means and that the viscous coupling is adjustable along the longitudinal axis.

4. A coupling unit according to claim 1, wherein the viscous coupling in the coupling housing is arranged between the two pressure plates of the two friction couplings.

5. A coupling unit according to claim 1, wherein the housing comprises a separating wall.

* * * * *

UNITED STATES PATENT AND TRADEMARK OFFICE
CERTIFICATE OF CORRECTION

PATENT NO. : 5,890,573

DATED : April 6, 1999

INVENTOR(S) : Georg Kwoka

It is certified that error appears in the above-identified patent and that said Letters Patent is hereby corrected as shown below:

Title page, Under the Foreign Application Priority Data, please include:
-- Dec. 3, 1996 [DE] Germany .................................................. 19650039.7 --

UNITED STATES PATENT AND TRADEMARK OFFICE
CERTIFICATE OF CORRECTION

PATENT NO. : 5,890,573

DATED : April 6, 1999

INVENTOR(S) : Georg Kwoka

It is certified that error appears in the above-identified patent and that said Letters Patent is hereby corrected as shown below:

Front Page, References cited, 4th Foreign Patent Document, 0 391 722, please delete "4/1991", and insert therefore, -- 4/1990 --;

Second Page, References cited, 5th U.S. Patent Document, 5,058,027, please delete "10/1991", and insert therefore, -- 11/1977 --;

Column 9, line 21, please delete "171", and insert therefore, -- 17" --;

Signed and Sealed this

Ninth Day of May, 2000

*Attest:*

Q. TODD DICKINSON

*Attesting Officer*    *Director of Patents and Trademarks*